(12) United States Patent
Cis et al.

(10) Patent No.: US 10,937,585 B2
(45) Date of Patent: Mar. 2, 2021

(54) ELECTROMAGNETIC DEVICE

(71) Applicant: Hamilton Sundstrand Corporation, Charlotte, NC (US)

(72) Inventors: Marcin Cis, Lutynia (PL); Patryk Szczesny, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 85 days.

(21) Appl. No.: 16/223,156

(22) Filed: Dec. 18, 2018

(65) Prior Publication Data

US 2019/0198218 A1    Jun. 27, 2019

(30) Foreign Application Priority Data

Dec. 22, 2017   (EP) ..................... 17461649

(51) Int. Cl.
| | |
|---|---|
| H01F 21/06 | (2006.01) |
| H01F 27/26 | (2006.01) |
| H01F 27/38 | (2006.01) |
| G01D 5/22 | (2006.01) |
| H01F 27/32 | (2006.01) |
| H01F 41/02 | (2006.01) |

(52) U.S. Cl.
CPC .......... *H01F 21/06* (2013.01); *G01D 5/2291* (2013.01); *H01F 27/263* (2013.01); *H01F 27/325* (2013.01); *H01F 27/38* (2013.01); *H01F 41/02* (2013.01); *H01F 41/024* (2013.01)

(58) Field of Classification Search
CPC ........ H01F 21/06; H01F 27/38; H01F 27/263; H01F 27/325; H01F 41/024
See application file for complete search history.

(56) References Cited

U.S. PATENT DOCUMENTS

| | | | |
|---|---|---|---|
| 3,562,916 A | 2/1971 | Duckworth | |
| 4,366,718 A | 1/1983 | Nelson | |
| 6,605,940 B1 | 8/2003 | Tabrizi et al. | |
| 9,677,913 B2 * | 6/2017 | Wang | G01D 5/20 |
| 2004/0080313 A1 * | 4/2004 | Brosh | G01D 5/2291 |
| | | | 324/207.18 |

(Continued)

FOREIGN PATENT DOCUMENTS

WO    2015150965 A1    10/2015

OTHER PUBLICATIONS

Extended European Search Report for International Application No. 17461649.0 dated Jun. 26, 2018, 10 pages.

(Continued)

*Primary Examiner* — Dominic E Hawkins
(74) *Attorney, Agent, or Firm* — Cantor Colburn LLP (57) ABSTRACT

An electromagnetic device is disclosed, the electromagnetic device comprising a core support having an exterior surface comprising at least one radial protrusion, a tubular magnetic core positioned around a portion of the length of the core support, the tubular magnetic core having an interior surface, at least one indent located in the interior surface of the tubular magnetic core, wherein the at least one protrusion is located within the at least one indent to prevent relative longitudinal movement between the core support and tubular magnetic core, and a primary coil and at least one secondary coil, each coil positioned around a portion of a length of the tubular magnetic core.

16 Claims, 5 Drawing Sheets

(56) References Cited

U.S. PATENT DOCUMENTS

| | | | |
|---|---|---|---|
| 2004/0140880 A1* | 7/2004 | Haugs | H01F 41/02 336/229 |
| 2008/0258739 A1* | 10/2008 | Niwa | G01D 5/2013 324/654 |
| 2010/0026430 A1 | 2/2010 | Zach et al. | |
| 2012/0225784 A1* | 9/2012 | Piascik | H01B 3/12 505/150 |
| 2012/0326824 A1* | 12/2012 | Harris | G01D 5/2291 336/130 |
| 2015/0108969 A1* | 4/2015 | Krenik | G01D 5/2258 324/207.18 |
| 2016/0033306 A1* | 2/2016 | Hubbell | G01D 5/2291 244/76 R |
| 2016/0222957 A1* | 8/2016 | Robison | F04B 49/20 |
| 2017/0352464 A1* | 12/2017 | Sanchihar | H01F 21/06 |
| 2018/0180446 A1* | 6/2018 | Smith | G01D 5/2291 |

OTHER PUBLICATIONS

EPO Official Letter for Application No. 17461649.0, dated Mar. 5, 2020, 7 pages.

* cited by examiner

ELECTROMAGNETIC DEVICE

FOREIGN PRIORITY

This application claims priority to European Patent Application No. 17461649.0 filed Dec. 22, 2017, the entire contents of which is incorporated herein by reference.

FIELD

The present disclosure generally relates to electromagnetic devices, magnetic cores for such electromagnetic devices, and methods for forming such magnetic cores. The present disclosure is also related to Linear Variable Differential Transducers, and methods of making such Linear Variable Differential Transducers.

BACKGROUND

Magnetic cores are used to contain and guide a magnetic field in an electromagnetic device. The magnetic core may also strengthen the magnetic field. An example of an electromagnetic device which may include a magnetic core is a Linear Variable Differential Transducer (LVDT). LVDTs are used to detect or measure the displacement of moving components, such as a spool in a servovalve, or in any kind of actuator. An LVDT generally comprises three wire coils wound around a bobbin positioned around a magnetic core, wherein the bobbin is moveable relative to the magnetic core.

SUMMARY

From a first aspect the present disclosure provides an electromagnetic device comprising a core support having an exterior surface comprising at least one radial protrusion, a tubular magnetic core positioned around a portion of the length of the core support, the tubular magnetic core having an interior surface, at least one indent located in the interior surface of the tubular magnetic core, wherein the at least one protrusion is located within the at least one indent to prevent relative longitudinal movement between the core support and tubular magnetic core, and a primary coil and at least one secondary coil, each coil positioned around a portion of a length of the tubular magnetic core.

Longitudinal movement is that relative to the longitudinal axes of the core support and the magnetic core, which share a longitudinal axis.

The radial protrusion extends radially outwardly from the exterior surface of the core support, the radial axis being perpendicular to the longitudinal axis. The shape of the indent may match and be complementary to the shape of the protrusion located therein. The indent may be entirely surrounded by the inner surface of the tubular magnetic core, so at to prevent the longitudinal movement.

The at least one indent and the at least one protrusion may have matching or complementary profiles.

The at least one protrusion and the at least one indent are configured to prevent the relative movement of the tubular magnetic core and the core support at least in the longitudinal direction. Any longitudinal movement of the tubular magnetic core relative to the primary and at least one secondary coils may affect the working of the electromagnetic device. The at least one protrusion and the at least one indent may further prevent relative movement of the tubular magnetic core and the core support in other directions, such as the radial and/or circumferential direction.

The at least one protrusion may comprise at least one circumferential ring extending around the core support.

The circumferential ring may completely encircle the core support, or may be provided in one or more segments, which may have gaps therebetween. The circumferential ring may be perpendicular to the longitudinal axis of the core support.

Alternatively, the at least one protrusion may comprise any suitable shape or size of protrusion. The protrusion may have any suitable shape, such as circular, square, diamond, or oval.

The at least one protrusion may taper to a tip in a direction away from the exterior surface of the core support.

The taper is in the radial direction away from the centre of the core support. If the protrusion is a circumferential ring, the ring may have a tapered cross section. Alternatively, or additionally, a protrusion may be provided having a pyramidal or conical shape. The taper may extend from a base shape to a point (i.e. a tip). For example, a square base shape may result in a square based pyramid protrusion, or a circle base shape may result in a cone.

The at least one protrusion may comprise multiple protrusions.

For example, the multiple protrusions may comprise multiple circumferential rings. Circumferential grooves may be located between each two adjacent circumferential rings. Alternatively, or additionally, the multiple protrusions may comprise a pattern of "pin head" protrusions. Any suitable pattern may be used, for example a diamond, grid or random pattern.

The multiple protrusions may be the same or different types or shapes of protrusions. One or more of the multiple protrusions may have the same height, measured from the centre of the core support.

The indent may extend less than 50%, less than 40%, less than 30%, less than 20%, less than 10%, or less than 5% of the thickness of the sheet forming the tubular magnetic core. As the indent is on the interior surface of the tubular magnetic core, it may not substantially affect the flow of magnetic flux in the core in use.

The tubular magnetic core may be formed from a rolled or folded sheet material. The rolled or folded sheet material may be a magnetisable sheet.

The tubular magnetic core may comprise a slit extending from a first longitudinal end of the tubular magnetic core to a second longitudinal end of the tubular magnetic core.

The indent may have been formed by pressing the interior surface of the tubular magnetic core onto the at least one radial protrusion.

For example, the tubular magnetic core may have been wound or folded onto the core support. The tubular magnetic core may be formed from a material that is softer or more ductile than the core support. Therefore, when the at least one protrusion is pressed against the interior surface of the tubular magnetic core, the at least one protrusion may form indents. In embodiments wherein the protrusion has a tapered profile, this aids in the formation of the indent, as the smaller tip will provide greater pressure on the interior surface of the tubular magnetic core.

The electromagnetic device may comprise an electrical power supply connected to the primary coil for generating a current therein.

The electromagnetic device may be a linear variable differential transducer, and the magnetic core may be moveable relative to the primary and secondary coils.

The electromagnetic device may further comprise a control unit configured to measure a current and/or a voltage of the at least one secondary coil and optionally output a signal indicative of the position of the tubular magnetic core within the device based on the current and/or a voltage measured.

The at least one protrusion(s) may be any suitable protrusion(s) that, in combination with the indent(s) prevent relative longitudinal movement of the core support and the tubular magnetic core. The protrusion(s) and indent(s) may also prevent circumferential movement, such as twisting.

Said primary coil may be wound around a first bobbin, a first secondary coil may be wound around a second bobbin, and a second secondary coil may be wound around a third bobbin. The first, second, and third bobbins may be positioned around a portion of a length of the magnetic core, the first bobbin being located between the second and third bobbins; and wherein there may be a gap between first bobbin and at least one of the second or third bobbins.

The first, second and third bobbins may be independent and separately formed. This allows the bobbins to be positioned around the magnetic core, and their positions relative to each other adjusted so that the LVDT provides the desired signal in use. For example, the positions of the bobbins may be adjusted so as to compensate for variability of the components caused by manufacturing tolerances.

The first, second and third bobbins may be fixedly attached to a support, e.g. by being positioned around a tubular support and being fixed thereto. Once the positions of the bobbins have been adjusted, the bobbins are fixedly attached to prevent further movement. This may be done by any suitable means, such as by gluing, clamping or welding.

A method for making the linear variable differential transducer is also contemplated herein. The method may comprise: (i) positioning the first, second and third bobbins around a portion of a length of the magnetic core; (ii) adjusting the positions of the first, second, and third bobbins relative to each other; and then (iii) fixing the positions of first, second and third bobbins relative to each other. This fixing of the positions of the bobbins may be performed by any suitable means, such as by gluing, clamping or welding.

The adjusting may be done to calibrate the linear variable differential transducer, and required due to the variability of the components.

The method may comprise: connecting the primary coil to a voltage supply; monitoring an electrical response at the first and second secondary coils; performing said step of adjusting the positions of the first, second, and third bobbins relative to each other until the bobbins are at positions in which the electrical response at the first and second secondary coils is a desired or predetermined response; and then fixing the first, second and third bobbins relative to each other in these positions.

The first aspect of the present disclosure also provides a method of forming the previously discussed electromagnetic device, the method comprising providing the core support, and rolling or folding a sheet of magnetisable material around the core support so as to form the tubular magnetic core, wherein the rolling or folding is performed such that the at least one protrusion on the core support penetrates the sheet of magnetisable material to form the at least one indent in the tubular magnetic core. The at least one protrusion being located in the at least one indent prevents relative longitudinal movement between the core support and the magnetic core.

The rolling or folding the sheet of magnetisable material may comprise reshaping the sheet having a first edge and an opposing second edge such that the first edge is aligned with the second edge in a circumferential direction of the tubular magnetic core. The first and second edges of the metal sheet may be joined to one another to form a continuous tubular.

Alternatively, the first and second edges may be spaced apart so as to define an elongate slit in the tubular magnetic core.

The sheet of magnetisable material may be more ductile and/or more soft than the core support, such that when the sheet of magnetisable material is pressed against the core support, the protrusion(s) will press into the magnetisable core, forming the indent(s) without the protrusion(s) deforming, or without the protrusion(s) substantially deforming.

A second aspect of the present disclosure provides a linear variable differential transducer comprising a magnetic core, a primary coil wound around a first bobbin, a first secondary coil wound around a second bobbin, and a second secondary coil wound around a third bobbin, wherein the first, second, and third bobbins are positioned around a portion of a length of the magnetic core, the first bobbin being located between the second and third bobbins, and wherein there is a gap between first bobbin and at least one of the second or third bobbins.

The first, second and third bobbins are independent and separately formed. This allows the bobbins to be positioned around the magnetic core, and their positions relative to each other adjusted so that the LVDT provides the desired signal in use. For example, the positions of the bobbins may be adjusted so as to compensate for variability of the components caused by manufacturing tolerances.

The first, second and third bobbins are fixedly attached in position relative to each other.

The first, second and third bobbins may be fixedly attached to a support.

Once the positions of the bobbins have been adjusted, the bobbins are fixedly attached to prevent further movement. This may be done by any suitable means, such as by gluing, clamping or welding.

The second aspect of the present disclosure may have any of the features of the first aspect of the present disclosure.

For example, the linear variable differential transducer may further comprise a core support having an exterior surface comprising at least one radial protrusion, wherein the magnetic core is a tubular magnetic core positioned around a portion of a length of a core support, and wherein the at least one protrusion is located within at least one indent in an interior surface of the tubular magnetic core to prevent relative longitudinal movement between the core support and tubular magnetic core.

The primary coil and secondary coils may be positioned around a portion of a length of the tubular magnetic core.

The at least one protrusion may extend radially outwardly from the exterior surface of the core support, the radial axis being perpendicular to the longitudinal axis. The shape of the indent may match and be complementary to the shape of the protrusion located therein. The indent may be entirely surrounded by the inner surface of the tubular magnetic core, so at to prevent the longitudinal The at least one indent and the at least one protrusion may have matching or complementary profiles.

The at least one protrusion and the at least one indent may be configured to prevent the relative movement of the tubular magnetic core and the core support at least in the longitudinal direction. Any longitudinal movement of the tubular magnetic core relative to the primary and at least one secondary coils may affect the working of the electromagnetic device. The at least one protrusion and the at least one indent may further prevent relative movement of the tubular magnetic core and the core support in other directions, such as the radial and/or circumferential direction.

The at least one protrusion may comprise at least one circumferential ring extending around the core support. The circumferential ring may completely encircle the core support, or may be provided in one or more segments, which may have gaps therebetween. The circumferential ring may be perpendicular to the longitudinal axis of the core support.

Alternatively, the at least one protrusion may comprise any suitable shape or size of protrusion. The protrusion may have any suitable shape, such as circular, square, diamond, or oval.

The tubular magnetic core may be formed from a rolled or folded sheet material. The rolled or folded sheet material may be a magnetisable sheet.

The tubular magnetic core may comprise a slit extending from a first longitudinal end of the tubular magnetic core to a second longitudinal end of the tubular magnetic core.

The indent may have been formed by pressing the interior surface of the tubular magnetic core onto the at least one radial protrusion. For example, the tubular magnetic core may have been wound or folded onto the core support. The tubular magnetic core may be formed from a material that is softer or more ductile than the core support. Therefore, when the at least one protrusion is pressed against the interior surface of the tubular magnetic core, the at least one protrusion may form indents. In embodiments wherein the protrusion has a tapered profile, this aids in the formation of the indent, as the smaller tip will provide greater pressure on the interior surface of the tubular magnetic core.

The LVDT may comprise an electrical power supply connected to the primary coil for generating a current therein.

The LVDT may further comprise a control unit configured to measure a current and/or a voltage of the at least one secondary coil and optionally output a signal indicative of the position of the tubular magnetic core within the LVDT based on the current and/or a voltage measured.

The second aspect of the disclosure also provides a method for making the previously discussed linear variable differential transducer comprising positioning the first, second and third bobbins around a portion of a length of the magnetic core, adjusting the positions of the first, second, and third bobbins relative to each other, and then fixing the positions of first, second and third bobbins relative to each other.

This fixing of the positions of the bobbins may be performed by any suitable means, such as by gluing, clamping or welding.

The adjusting may be done to calibrate the linear variable differential transducer, and required due to the variability of the components.

The method may comprise connecting the primary coil to a voltage supply, monitoring an electrical response at the first and second secondary coils, performing said step of adjusting the positions of the first, second, and third bobbins relative to each other until the bobbins are at positions in which the electrical response at the first and second secondary coils is a desired or predetermined response, and then fixing the first, second and third bobbins relative to each other in these positions.

BRIEF DESCRIPTION OF DRAWINGS

Various embodiments will now be described, by way of example only, and with reference to the accompanying drawings in which.

DETAILED DESCRIPTION

Figure 1A:
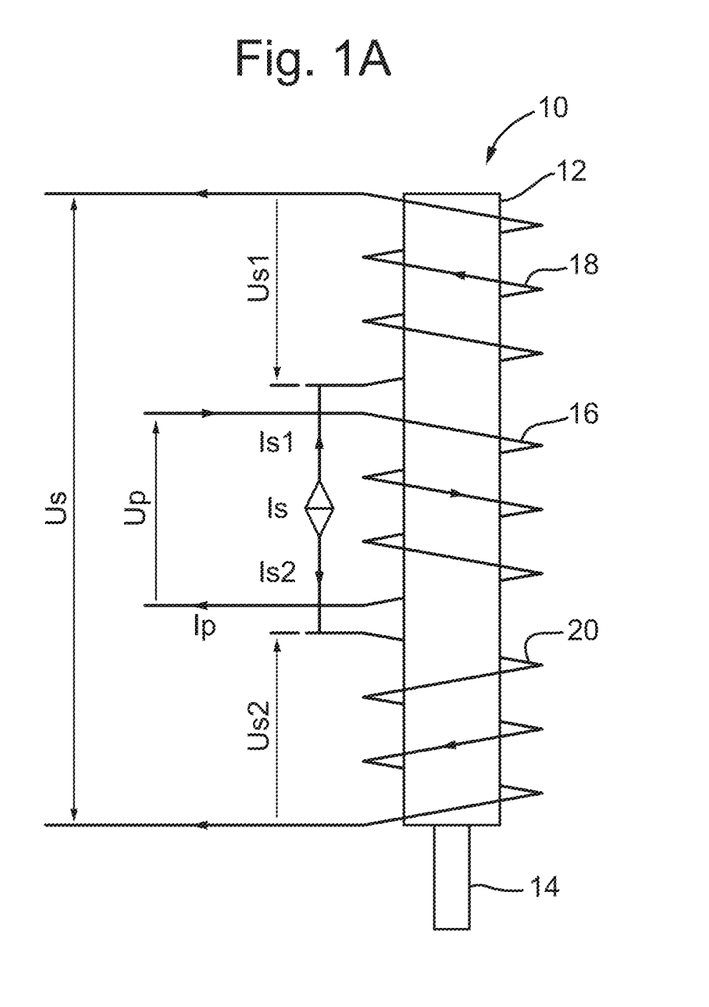
FIGS. 1A and 1B show schematics of a Linear Variable Differential Transducer (LVDT) in which the magnetic core is arranged in different positions.
Figure 1B:
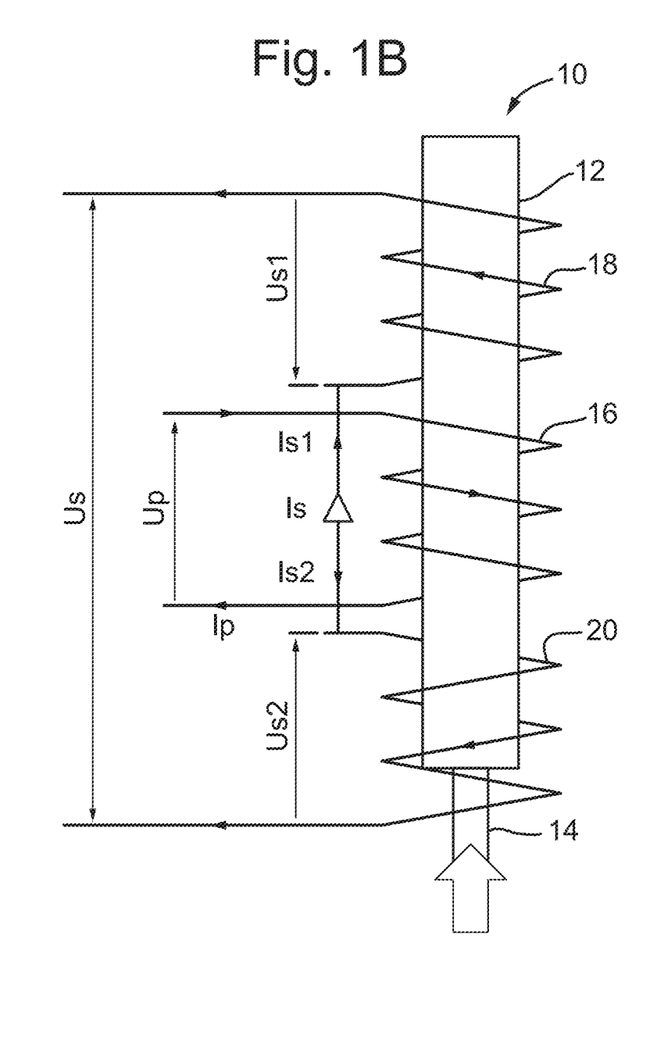

FIGS. 1A and 1B show a Linear Variable Differential Transducer (LVDT) 10 which may be used to detect or measure the displacement of a moving component. The LVDT 10 may comprise a magnetic core 12 mounted on a core support 14. The magnetic core 12 may comprise a soft magnetic material, e.g. Mu-metal, although other materials are contemplated herein. The magnetic core 12 may be in the form of a tubular structure. The magnetic core 12 may be attached or connected to the core support 14 by any suitable means, such as by welding, bonding, threaded engagement or interference fit.

Conventionally, magnetic cores have been formed or moulded as solid rods, or lathed from larger pieces of material.

The LVDT further comprises a primary coil 16 for generating a magnetic field when supplied with power, a first secondary coil 18 in which a current is induced by the magnetic field from the primary coil 16, and optionally a second coil 20 in which a current is induced by the magnetic field from the primary coil 16. The coils 16,18,20 may be wound around a common axis. The first and second secondary coils 18,20 may be substantially identical (i.e. they may comprise the same material, the same number and/or pitch of windings, and may have the same dimensions). However, the secondary coils 18,20 may be wound around the axis in opposite directions.

The coils 16, 18, 20 may have the same longitudinal axis as the magnetic core 12 and optionally also as the core support 14. The coils 16, 18, 20 may wind around or encircle portions of the magnetic core in the longitudinal direction. The primary coil 16 may be located between the first secondary coil 18 and the second secondary coil 20, and may be equidistant from each. The magnetic core 12 and the core support 14 may move relative to the coils 16, 18, 20 along the longitudinal axis, allowing the magnetic core 12 to be displaced relative to the coils 16, 18, 20.

The primary coil 16 may be supplied with an alternating voltage Up (i.e. by an AC voltage supply), causing an alternating current Ip in the primary coil 16. This causes a magnetic field to be generated in the known manner, which is somewhat confined and focussed by the magnetic core 12. The magnetic core 12 helps transfer the magnetic field to the first and second secondary coils 18, 20, inducing currents Is1 and Is2 respectively in the first and second secondary coils 18,20. The first and second coils 18, 20 will thus have a potential differences Us1 and Us2 across them respectively. The resulting potential difference across the two secondary coils Us=Us1+Us2.

LVDTs may be used for various purposes, such as to monitor the position of components in valves or actuators, for example in engines. This may be achieved by coupling the core support 14 to the movable component.

FIG. 1A shows the LVDT when the magnetic core 12 is located centrally within the coils 16, 18, 20 along the longitudinal axis, such that the magnetic core 12 extends the same distance into or beyond each of the first and second secondary coils 18, 20. When the primary coil 16 is supplied with an alternative voltage Up, the currents generated in the first and second secondary coils 18,20 will be of the same magnitude, but in opposite directions, i.e. Is1=−Is2. The resultant potential difference Us of the combined secondary coils 18,20 will thus be zero.

FIG. 1B shows the LVDT 10 when the magnetic core 12 has been displaced relative to the coils 16, 18, 20 from the central position along the longitudinal axis. In the depicted embodiment, the magnetic core 12 has been moved in the longitudinal direction towards the first secondary coil 18. The magnetic core 12 extends all the way through the first secondary coil 18, but only part way through the second secondary coil 20. When the primary coil 16 is supplied with the alternating voltage Up, currents Is1 and Is2 are generated in the first and second secondary coils 18, 20 as described above, and the current Is1 generated in the first secondary coil 18 will be greater in magnitude than the current Is2 generated in the second secondary coil 20. Therefore, the resultant potential difference Us across the secondary coils 18,20 will no longer be zero. In fact, the magnitude of the currents Is1 and Is2 (and hence the potential difference Us) may depend on the proportion of the coil through which the magnetic core 12 extends. Accordingly, the value of the potential difference Us is correlated to the position of the magnetic core 12.

The LVDT may include a control unit for measuring the currents Is1 and Is2 and/or the voltages Us1 and Us2 of the secondary coils 18,20. The control unit may include a processor to compare Us1 and Us2 and determine the resultant voltage Us. The resultant voltage may be indicative of the displacement of the magnetic core 12, and hence the movable component to which it is coupled.

Figure 2:
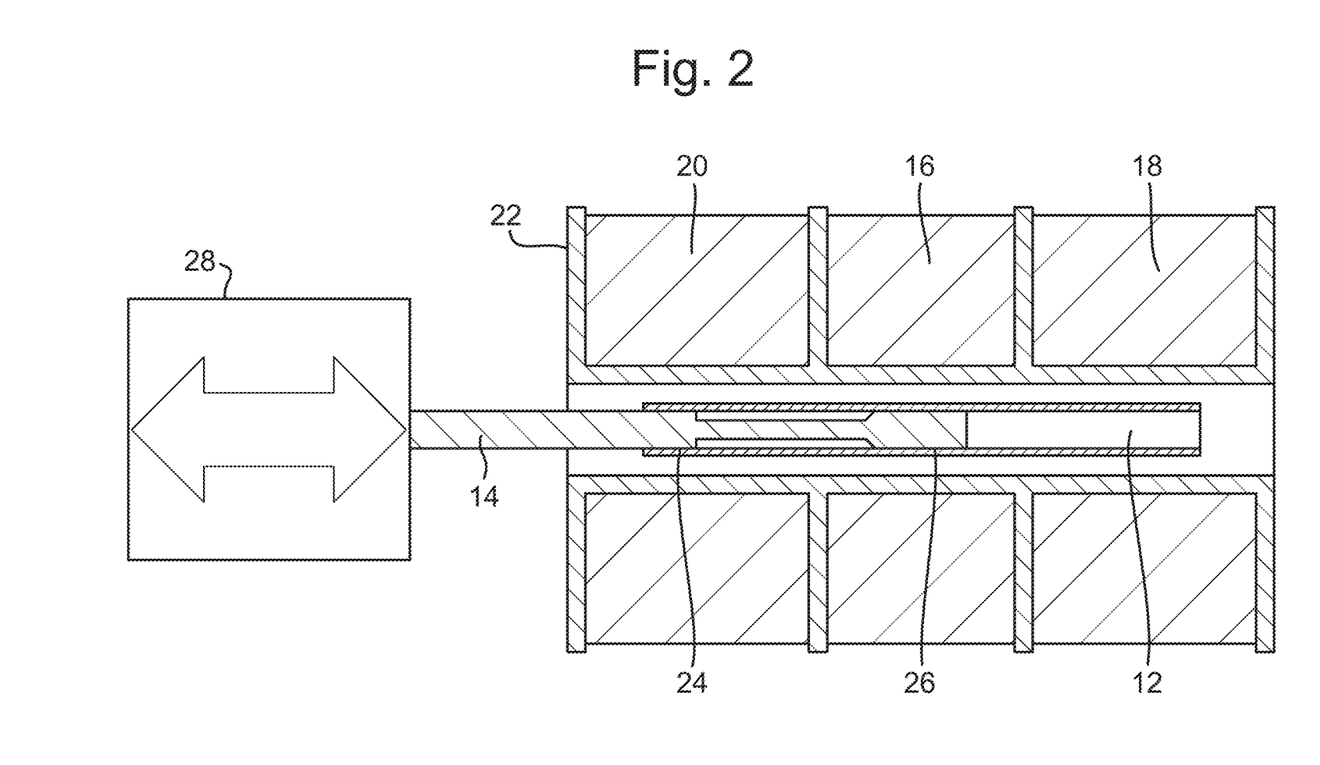
FIG. 2 shows a cross-sectional view of a Linear Variable Differential Transducer (LVDT) that is attached to a load.

FIG. 2 shows a side cross-sectional view of the Linear Variable Differential Transducer (LVDT) whilst attached to a movable member 28. The primary coil 16, first secondary coil 18 and second secondary coil 20 may be wound around and located on a bobbin 22. As described above, the magnetic core 12 may be a tubular. The core support 14 may be located partially within the magnetic core 12. The core support 14 may be attached to the interior of the magnetic core 12, for example, at two attachment locations 24, 26.

The core support 14 may be attached to the movable member 28. The movable member 28 may be a component of any suitable system, the position or movement of which is desired to be detected. For example, the movable member 28 may be a spool of a servovalve, or a moving part of any kind of actuator. The bobbin 22 may be attached to a housing of the system including the movable member 28.

The magnetic core 12 may move along the longitudinal axis in a sealed chamber (e.g. within the bobbin 22), which may contain air, another gas, or a liquid, such as a hydraulic fluid, for example Skydrol®. When the magnetic core 12 moves within the chamber, the fluid must therefore move from one side of the magnetic core 12 to the other side of the magnetic core 12 within the chamber. This may occur through a small clearance between the magnetic core 12 and surrounding surface of the chamber (e.g. the radially inner surface of the bobbin 22). This causes damping forces, which may affect and dampen the movement of the magnetic core 12.

Figure 3A:
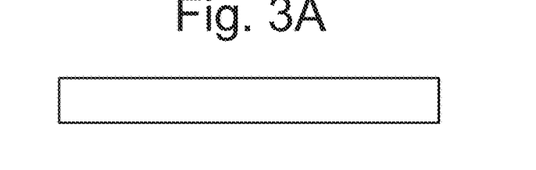
FIGS. 3A, 3B and 3C show a method of forming a magnetic core for the LVDT of FIGS. 1A, 1B and 2.
Figure 3B:
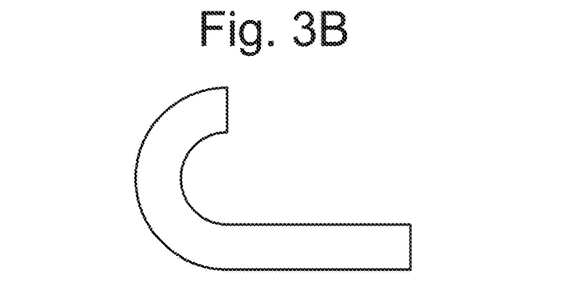
Figure 3C:
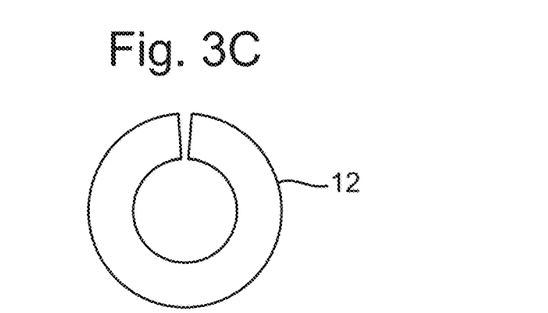

FIGS. 3A, 3B and 3C show a method of forming a magnetic core for the LVDT of FIGS. 1A, 1B and 2. The metal sheet may comprise a soft, ductile magnetic material. For example, the material may have 45% elongation at break, and be easily plastically formed. FIG. 3A shows a side view of a flat metal sheet. FIG. 3B shows the metal sheet of FIG. 3A having been partially bent or rolled. FIG. 3C shows the metal sheet of FIGS. 3A and 3B having been fully bent or rolled to be a tubular having a substantially circular cross section (transverse to the longitudinal axis of the core 12). As shown in FIG. 3C, the metal sheet may be rolled or bent so that the opposing edges of the sheet are adjacent or proximate each other, and to align with one another in a circumferential direction. The edges may not meet, thus resulting in a tubular having a discontinuity or slit along the length thereof. When the tubular of the magnetic core 12 includes such a discontinuity, this may be useful in the embodiments in which the magnetic core 12 is arranged in the fluid filled chamber, since the fluid in the sealed chamber may flow along the channel formed by the discontinuity, reducing the damping forces acting on the magnetic core 12. Alternatively, the edges of the sheet may meet, and/or the edges may be joined together by any suitable means, such as welding, soldering or adhesives. The sheet may be rolled or bent such that it does not overlap itself, e.g. the ends of the sheet do not overlap over portions of the sheet (e.g. the sheet is not rolled in a spiral). The tubular core 12 may therefore be formed so as to have only a single layer of the sheet arranged radially outward from its central axis.

In embodiments, the inventors have recognised relatively thin sheets can be used to make the core, especially in LVDTs, as they monitoring the signal, rather than needing to strongly focus the magnetic field, which generally requires a thicker, solid magnetic core. A core formed from a sheet decreases the cost of material (e.g. because 100% of the material is used), and decreases manufacturing costs and times. Further, there may be some reduction in gross eddy currents as opposed to previous solid cores, and the cores may be more accurate, i.e. provide more uniform magnetic fields.

Figure 4:
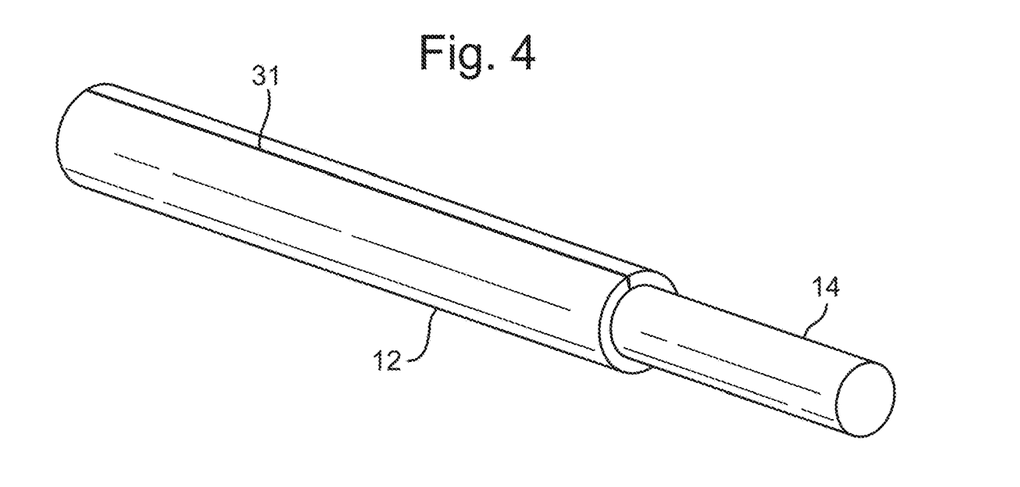
FIG. 4 shows an embodiment of a magnetic core 12, which may be formed by the method shown in FIGS. 3A-C.

FIG. 4 shows an embodiment of the magnetic core 12, which may be formed by the method shown in FIGS. 3A-C. The magnetic core 12 may include a slit or discontinuity 31 along the length thereof. The magnetic core 12 is connected to a core support 14.

The core support 14 may be connected to the magnetic core 12 by any suitable means, such as by adhering, welding, bonding, or interference fit. Alternatively, the magnetic core 12 may be rolled or bent around a core support 14 such that at least one protrusion on the magnetic core 12 projects into and forms a recess in the core support 14.

Figure 5A:
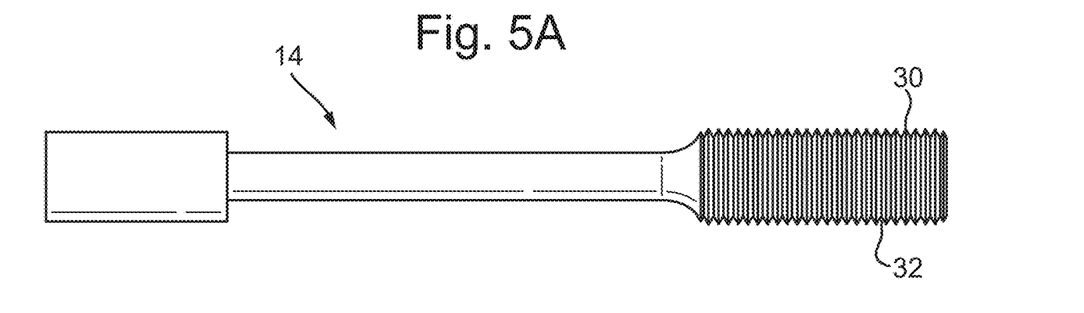
FIG. 5A shows a core support for a Linear Variable Differential Transducer.

FIGS. 5A-5D show an embodiment wherein the magnetic core 12 is rolled around the core support 14 such that at least one protrusion on the magnetic core 12 projects into and forms a recess in the core support 14. The core support 14 may have one of more protrusions extending from the exterior surface thereof, e.g. extending radially outward. FIG. 5A shows a core support 14 having a plurality of protrusions 30 extending from a section thereof. The plurality of protrusions 30 are in the form of circumferential ridges having grooves 32 therebetween. The ridges may be ring-shaped around the axis of the core support 14, rather than helical. In alternative embodiments, the core support 14 may comprise only one protrusion or protrusions having other configurations. For example, one circumferential ridge, or one or more other shaped protrusions, such as in a regular or irregular pattern of protrusions may be provided. The shaped protrusions have a height in the radial direction and may have a width substantially similar or different to their length. The base of each protrusion may be a triangle, circle, oval, square or diamond. The protrusions may have any suitable shape. The protrusion may tapered in the radial direction to a tip. For example, the circumferential ridges may have a triangular cross-section, and shaped protrusions may be conical or pyramid shaped.

The magnetic core 12 may be formed from a more ductile (or softer) material than the core support 14. The magnetic core 12 may be formed from a metal sheet, as in the method described with r\elation to FIGS. 3A-C, but further being rolled or bent directly onto or around the core support 14 such that the at least one protrusion 30 on the core support 14 penetrates into the interior surface of the magnetic core 12. This may prevent the magnetic core 12 moving longitudinally and/or circumferentially relative to the core support 14. The resulting arrangement is shown in FIG. 5B.

As shown in FIG. 5A, the core support may have multiple tapered circumferential protrusions 30 extending from the exterior surface thereof. The protrusions 30 may have been formed by multiple grooves 32 being rolled or cut into the core support 14. The at least one protrusion 30, such as the multiple tapered circumferential protrusions, may be located on an otherwise cylindrical portion of the core support 14. The multiple tapered circumferential grooves 30 may circumscribe the core support 14, and/or may be equidistantly spaced.

Figure 5B:
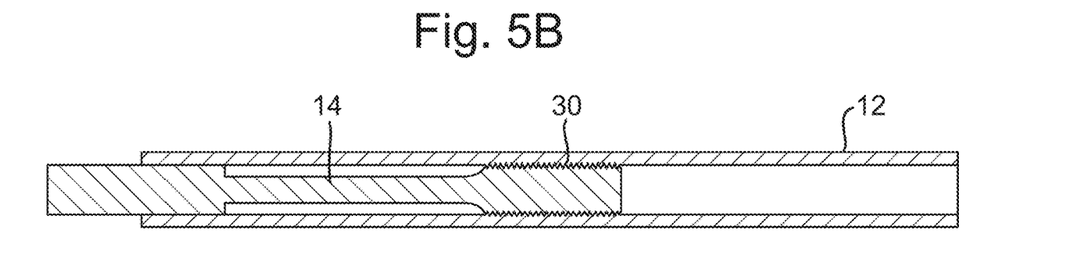
FIG. 5B shows a magnetic core and the core support of FIG. 5A.
Figure 5C:
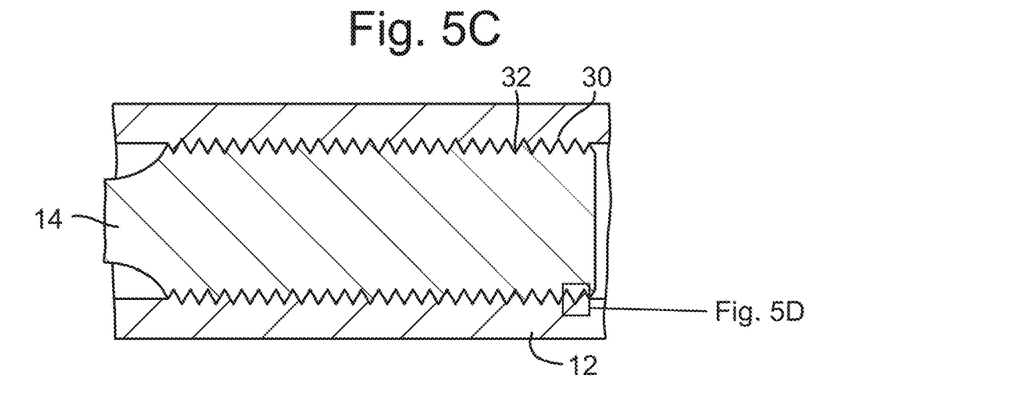
FIG. 5C shows an enlarged view of a portion of FIG. 5B.
Figure 5D:
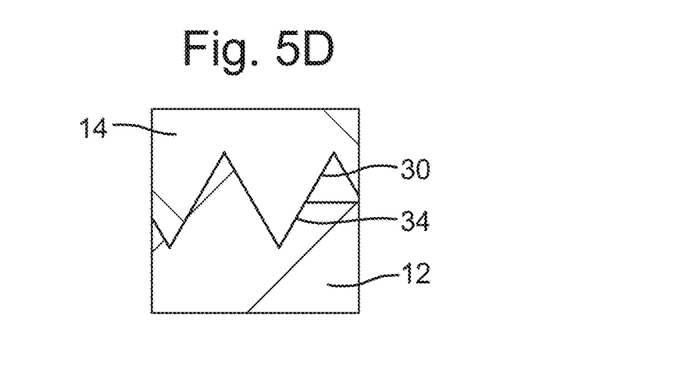
FIG. 5D shows a further enlarged view of a portion of FIG. 5C.

FIG. 5C shows an enlarged view of a portion of FIG. 5B and FIG. 5D shows a further enlarged view of a portion of FIG. 5C. As shown in FIGS. 5C and 5D, once the magnetic core 12 has been rolled directly around the core support 14, the magnetic core 12 comprises indents 34 formed by the protrusions 30 pressing into the magnetic core 12. The protrusions 30 then sit within the indents 32 formed thereby, and prevent the longitudinal movement of the magnetic core 12 relative to the core support 14.

As can be seen in FIGS. 5C and 5D, the material of the magnetic core 14 may have been displaced by the protrusions 30 when forming the indents 34. This may cause some of the material to extend into the grooves 32 between the protrusions 30.

Figure 6:
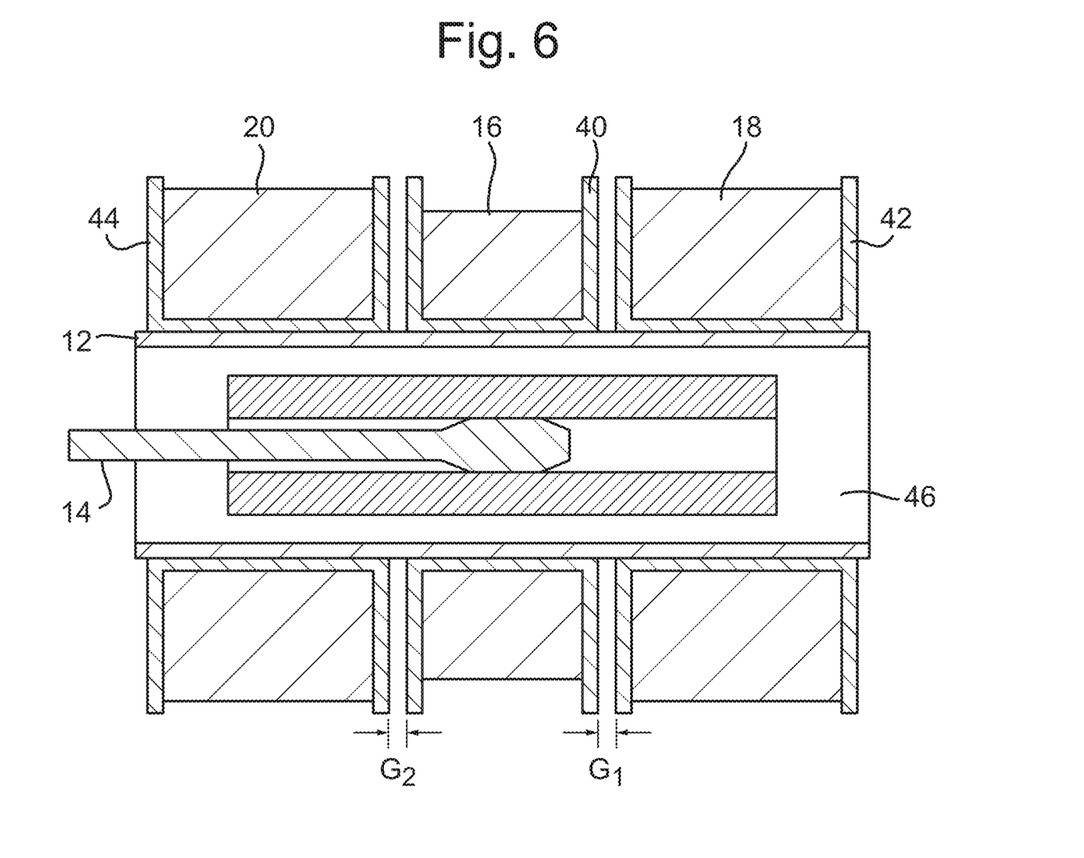
FIG. 6 shows a Linear Variable Differential Transducer in which bobbins have been positioned therearound.

FIG. 6 shows a Linear Variable Differential Transducer wherein the primary coil 16, and first and second secondary coils 18, 20 are wound around first, second and third bobbins 40,42,44 respectively. The first, second and third bobbins 40,42,44 may be positioned around a tubular support 46 located around the magnetic core 12. The tubular support 46 may be fixed or connected to, or a part of, another housing (not shown). The first, second and third bobbins 40,42,44 are separately formed. There may be gaps $G_1$, $G_2$ between the first bobbin 40 and at least one of the second and third bobbins 42,44. The gaps $G_1$, $G_2$ may be the same or different. Either of the gaps $G_1$, $G_2$ may be zero, i.e. there may not be a gap. When the LVDT is being constructed, the desired bobbins (e.g. with coils already wound there around), may be selected, and positioned around the tubular support 46. The positions of the bobbins 40,42,44 (and, thus, the gaps $G_1$, $G_2$ between the bobbins 40,42,44) may then be adjusted to account for the variability of the components. This may be done by connecting the coils wound around the bobbins 40,42,44 to power sources, taking voltage or current readings (e.g. as described with respect to FIGS. 1A and 1B), then adjusting the longitudinal positions of the bobbins 40,42,44 about the tubular support 46 until a null reading, or a required bias, is obtained. The bobbins 40,42,44 may then be fixedly attached to the tubular support 46 at these longitudinal positions by any suitable means, such as by gluing, clamping or welding. This method may save both cost and material compared to previous methods, which use a single bobbin with three coils wound thereon. It also provides the desired adjustability, allowing a null or desired bias to be obtained without disassembling the entire LVDT, much more quickly. Further, it allows the construction of various LVDTs from a series of preformed (i.e. "on the shelf" bobbins), which aids in reducing cost and providing manufacturing flexibility. For instance, the bobbins (with the coils wound therearound) can be made as separate parts in bulk volumes, and the quality thereof (i.e. of the windings) can be controlled.

The magnetic core 12 may be connected to the core support using the technique described in FIGS. 5A-5D, or by another technique, e.g. as described in relation to FIGS. 3-4.

Although the present disclosure has been described with reference to various embodiments, it will be understood by those skilled in the art that various changes in form and detail may be made without departing from the scope of the accompanying claims.

For example, it is contemplated that only a single secondary coil may be used rather than the two coils 18,20, and the current induced in the single secondary coil may generate a potential difference across that coil that may be used to determine the position of the magnetic core 12.

Furthermore, although the magnetic core and coils have been discussed with respect to use in a Linear Variable Differential Transducer, it will be understood that the magnetic core and/or coils may be used in other electromagnetic devices, such as a solenoid magnet.

The invention claimed is:

1. An electromagnetic device comprising:
   a core support having an exterior surface comprising at least one radial protrusion;
   a tubular magnetic core positioned around a portion of the length of the core support, the tubular magnetic core having an interior surface;
   at least one indent located in the interior surface of the tubular magnetic core, wherein the at least one protrusion is located within the at least one indent to prevent relative longitudinal movement between the core support and tubular magnetic core; and
   a primary coil and at least one secondary coil, each coil positioned around a portion of a length of the tubular magnetic core;
   wherein the tubular magnetic core is formed from a rolled or folded sheet material; and
   wherein the indent has been formed by pressing the interior surface of the tubular magnetic core onto the at least one radial protrusion.

2. The electromagnetic device of claim 1, wherein the at least one indent and the at least one protrusion have matching or complementary profiles.

3. The electromagnetic device of claim 2, wherein the at least one protrusion comprises multiple protrusions.

4. The electromagnetic device of claim 1, wherein the at least one protrusion comprises at least one circumferential ring extending around the core support.

5. The electromagnetic device of claim 4, wherein the at least one circumferential ring comprises multiple circumferential rings.

6. The electromagnetic device of claim 1, wherein the at least one protrusion tapers to a tip in a direction away from the exterior surface of the core support.

7. The electromagnetic device of claim 1, wherein the electromagnetic device is a linear variable differential transducer, and wherein the magnetic core is moveable relative to the primary and secondary coils.

8. The electromagnetic device of claim 7, comprising said primary coil wound around a first bobbin, a first secondary coil wound around a second bobbin, and a second secondary coil wound around a third bobbin; wherein the first, second, and third bobbins are positioned around a portion of a length of the magnetic core, the first bobbin being located between the second and third bobbins; and wherein there is a gap between first bobbin and at least one of the second or third bobbins.

9. The electromagnetic device of claim 1, wherein the at least one protrusion located within the at least one indent prevents circumferential movement between the core support and the tubular magnetic core.

10. A method of forming the electromagnetic device that includes: a core support having an exterior surface comprising at least one radial protrusion; a tubular magnetic core positioned around a portion of the length of the core support, the tubular magnetic core having an interior surface; at least one indent located in the interior surface of the tubular magnetic core, wherein the at least one protrusion is located within the at least one indent to prevent relative longitudinal movement between the core support and tubular magnetic core; and a primary coil and at least one secondary coil, each coil positioned around a portion of a length of the tubular magnetic core, wherein the tubular magnetic core is formed from a rolled or folded sheet material, and wherein the indent has been formed by pressing the interior surface of the tubular magnetic core onto the at least one radial protrusion, the method comprising:
providing the core support; and
rolling or folding a sheet of magnetisable material around the core support so as to form the tubular magnetic core, wherein the rolling or folding is performed such that the at least one protrusion on the core support penetrates the sheet of magnetisable material to form the at least one indent in the tubular magnetic core.

11. The method of claim 10, wherein the sheet of magnetisable material is more ductile or more soft than the core support, and the method further comprises pressing the sheet of magnetisable material against the core support such that the at least one protrusion will press into the tubular magnetic core to form the at least one indent without the at least one protrusion substantially deforming.

12. A linear variable differential transducer comprising:
a magnetic core;
a primary coil wound around a first bobbin;
a first secondary coil wound around a second bobbin; and
a second secondary coil wound around a third bobbin;
wherein the first, second, and third bobbins are positioned around a portion of a length of the magnetic core, the first bobbin being located between the second and third bobbins; and
wherein there is a gap between first bobbin and at least one of the second or third bobbins.

13. The linear variable differential transducer of claim 12, wherein the first, second and third bobbins are fixedly attached to a support.

14. The linear variable differential transducer of claim 12, further comprising a core support having an exterior surface comprising at least one radial protrusion, wherein the magnetic core is a tubular magnetic core positioned around a portion of a length of a core support, and wherein the at least one protrusion is located within at least one indent in an interior surface of the tubular magnetic core to prevent relative longitudinal movement between the core support and tubular magnetic core.

15. A method for making the linear variable differential transducer of claim 12, the method comprising:
(i) positioning the first, second and third bobbins around a portion of a length of the magnetic core;
(ii) adjusting the positions of the first, second, and third bobbins relative to each other; and
(iii) after (ii), fixing the positions of first, second and third bobbins relative to each other.

16. The method of claim 15, comprising:
connecting the primary coil to a voltage supply;
monitoring an electrical response at the first and second secondary coils;
performing said step of adjusting the positions of the first, second, and third bobbins relative to each other until the bobbins are at positions in which the electrical response at the first and second secondary coils is a desired or predetermined response; and then
fixing the first, second and third bobbins relative to each other in these positions.

* * * * *